United States Patent [19]
Hirschman et al.

[11] 3,889,169
[45] June 10, 1975

[54] POSITION AND VELOCITY SERVO CONTROL FOR MOTOR CONTROLLED ARTICLE CARRIER AND HANDLER

[75] Inventors: Joel A. Hirschman, San Jose, Calif.; Howard E. Van Winkle, Boulder, Colo.

[73] Assignee: International Business Machines Corporation, Armonk, N.Y.

[22] Filed: Oct. 11, 1973

[21] Appl. No.: 405,611

[52] U.S. Cl. ............ 318/571; 214/16.4 R; 318/326; 318/463; 318/603; 318/608; 318/618

[51] Int. Cl. ........................................... G05b 13/00

[58] Field of Search ........... 318/571, 593, 594, 603, 318/604, 605, 640, 648, 608, 618, 162–164, 309, 310, 312, 313, 326, 329, 393, 396–398, 461–463; 360/54, 63, 71–73, 88; 214/16.4 R; 340/172.5; 250/230 R, 236

[56] References Cited

UNITED STATES PATENTS

| | | | |
|---|---|---|---|
| 3,154,730 | 10/1964 | Houldin et al. | 318/313 X |
| 3,176,279 | 3/1965 | Lin et al. | 360/88 |
| 3,213,437 | 10/1965 | Dirks | 360/54 |
| 3,299,407 | 1/1967 | Ikegami et al. | 340/172.5 |
| 3,378,827 | 4/1968 | Hertrich | 360/72 |
| 3,544,800 | 12/1970 | Elliott | 250/236 X |
| 3,654,553 | 4/1972 | Mary et al. | 318/313 X |
| 3,748,563 | 7/1973 | Pomella et al. | 318/571 X |
| 3,809,263 | 5/1974 | Dodd et al. | 214/16.4 R |

OTHER PUBLICATIONS

IBM Technical Disclosure Bulletin, Vol. 5, No. 11, April 1963, pp. 32–33, "Strip Storage Access Mechanism," by D. D. Johnson et al.

*Primary Examiner*—James R. Scott
*Attorney, Agent, or Firm*—Herbert F. Somermeyer

[57] ABSTRACT

A continuously moving information-bearing article carrier and a selectively actuated article handler are in peripheral velocity synchronism for exchanging information-bearing articles. In a preferred form, the carrier is a rotating cylinder having a large plurality of information-bearing articles spaced about its periphery and extending outwardly of the outer periphery for facilitating dynamic article exchanges. Peripheral velocity and positioning synchronism between the article carrier and handler is achieved by incorporating the desired synchronism characteristics into a control tachometer on the handler and maintaining the carrier tachometer linear. Such characteristics result from variable spacing between tachometer marks representing the acceleration characteristics of the article handler.

9 Claims, 11 Drawing Figures information-bearing, media-containing article preferred to be used with the present invention.

DETAILED DESCRIPTION

Referring now to the drawing, like numbers indicate like parts and structural features in the various diagrams and views. In FIG. 1, continuously rotating carrier of carousel 10 releasably carries a plurality of information-bearing media storage containers 12 along its outer periphery as described later with respect to FIG. 2A. Each article 12 has a pair of axially extending peripheral annular flanges or rims 32 and 34 for facilitating article 12 transfer. Disposed adjacent to and about the periphery of carousel 10 is a plurality of article transfer stations 14, 16, 18, and 20. Each article transfer station 14–20 can be any one of several arrangements as will be further explained and illustrated. Associated with each station 14–20 is an article processing station represented by blocks 22. The details of the article processing station 22 are not pertinent to the present invention and are not described in detail for that reason. It suffices to say that the exchange of articles between the various article transfer stations 14–20 and the processing stations 22 follows the same principles as will be described for exchange of articles with the rotating carousel 10. Inside each processing station 22, a cover of the article 12 (which may be a sleeve) is axially removed; and then the magnetic media, (not shown) preferably a magnetic tape, is unwound through a transducing station (not shown). Other forms of covers and cartridge arrangements are usable with equal facility. Transducing operations then exchange data signals with the record media (not shown). Upon completion of the processing operation, the media is rewound on a spool (not shown) containable within one of said articles 12. The cover is then replaced on the spool and the tape whereupon it is returned to the article transfer station 14–20 for reinsertion in the rotating carrier 10. By providing a plurality of article transfer stations 14-20, interleaved data processing access to the articles, as well as interleaved storage accessing, may be employed. An example of a processing station is shown by Camras in U.S. Pat. No. 3,134,550.

Carousel 10 consits of upper and lower circular plates 24 and 26, each of which has facing yieldable article-retaining detents 43 and 44, later described, for releasably retaining each of the articles 12 on the periphery of carousel 10. Each of the articles 12 has a portion extending beyond the outer peripheral edges 32 and 34 of the upper and lower plates 24 and 26, respectively . The axially extending annular flanges or rims 32 and 34 of each article 12 in the transfer station 14–20 while it is still being releasably retained in the rotating carousel 10. As the transfer station 14–20 removes the article 12 from the carousel 10, the yieldable detents 43 and 44 give way to provide a smooth transfer. As will be later described, substantially similtaneous transfer of articles 12 to and from a rotating carousel 10 is possible with the illustrated article tranfer stations 14–20. Stations 14–20 for handling but one cartridge or article 12 are also usable.

Referring more particularly now to FIGS. 2, 2A, and 3, the kinematics of dynamic article transfer are described. Each article transfer station 14–20 preferably has an intermittently rotatable article transfer member 30, as later more fully described. On each end of member 30 is a pair of controllable article-grasping detents 46, 47, 50 and 51 which fit over the axially extending flanges 32 and 34 of the article to be exchanged during article transfer from carrier 10 to an article processing station 22. In an article fetch, member 30 article-grasping detents 46, 47, 50, and 51 move over the axially extending flanges 32 and 33 of article 12 and are clamped securely thereover, pulling the stored article 12 from carrier 10. During a storage operation, i.e., return of the article to the carrier 10, such detents 46, 47, 50, and 51 are firmly holding the article 12; then as soon as the article 12 is inserted in the carrier 10, the detents 46, 47, 50, and 51 are released, releasing the article to the carrier.

FIG. 3 illustrates a typical velocity control curve for rotating member 30 for effecting an article 12 exchange. In addition to position controls, it is important that the tangential velocity of member 30 and of carrier 10 be equal during the exchange time at 40. This identicalness of velocity and positioning should be maintained for a relatively short period of time, such as 20° of member 30 rotation. The timing must be such that a selected article or cartridge 12 does not stride other cartridges. This time is determined by cartridges size and placement in the carrier 10. During one complete revolution, each member 30 can access or fetch two articles 12 from carrier 10, deposit or store two articles 12 in a carrier 10, or access article 12 and store a second article 12.

FIG. 2A shows one form of yieldable retaining members 43 and 44 in carrier 10. Each cartridge storage location 41 has a set of three detents 43 and 44 on each of plates 24 and 26. The radially inward detents 44 are all on a common circle about axis of rotation 42 and are preferably conically shaped and fixed to the respective upper and lower plates 24 and 26. The facing radially outward detents 43 are cone-shaped and spring-biased toward each other; that is, the radially outward detents 43 are spring biased upwardly in the lower plate 26 and spring biased downwardly in the upper plate 24. The annular flanges 32 and 34 lie between the fixed detents 44 and the spring-loaded detents 43 in their respective plates 24 and 26. This not only accurately positions article 12 in the carrier 10 in the respective storage locations 41, but also permits an article 12 to be insertd or removed from the storage locations 41 merely by overcoming the spring biasing of the radially outer detents 43, but with a greater spring force.

Each circular plate 24, 26 includes an annular radial outward article protecting portion 24A and 26A. These protecting portions 24A and 26A are sufficiently spaced apart to permit radial access to a stored article 12 by member 30. Each stored article 12 extends radially outwardly of the respective storage location, as shown, to facilitate accessing.

Rotatable member 30 has a pair of facing detent fingers 46 and 47 movable over flanges 32 and 34 for grasping article 12 as best seen in FIG. 10. As will be later described, when moving an article 12 from carousel 10, detents 46 and 47 respectively move over flanges 32 and 34 and then toward each other to firmly grasp article 12. As carousel 10 and member 30 rotate, as shown by the arrows 48 and 49, article 12 is removed from carousel 10.

Opposite to detents 46 and 47 is another set of detents 50 and 51 which may contain another article 12 for reinsertion into carousel 10. Downstream storage location 41A has no article stored therein; therefore,

POSITION AND VELOCITY SERVO CONTROL FOR MOTOR CONTROLLED ARTICLE CARRIER AND HANDLER

RELATED APPLICATION

The present application discloses a positioning and velocity control usable with the apparatus shown in U.S. Pat. application Ser. No. 364,854, filed May 29, 1973, now U.S. Pat. No. 3,809,263 and commonly assigned.

BACKGROUND OF THE INVENTION

The present invention relates to position and velocity control systems.

Automatic transfer of a record media, such as magnetic strips, tape, film, and the like, has been employed in the past for providing a relatively high data rate between the storage media and a connected processing unit, printer, or the like. An early example of such an automatic retrieval system is shown in the Burke et al U.S. Pat. Nos. 2,941,738 and 2,941,739. These systems have a relativley large spool of tape contained in a cartridge stored in facing open-sided arrays of storage compartments. A transfer mechanism travels between the facing arrays, storing and fetchig such spools of tape to and from the storage compartments. Attached to the arrays via a centrally located aperture or port in such array is a pair of tape drives of processing stations. Automatic mechanisms transfer the spools of tape between the tape drive and the central aperture for further exchange with the transfer mechanisms and the storage compartments. while this system provides a relatively high data rate, the access time from the storage compartment to the tape drive is relatively long, i.e., measured in several seconds.

Since that time, several inventions have been made decreasing the transfer time between the storage compartment and the processing station. Further, the media geometry was changed such that it would be much lighter, i.e., easier to transport, thereby reducing the access time. While this may be desirable, the quantity of data storable on each article, including a storage media, may be substantially reduced. In some applications, this may not be too detrimental. However, in other applications, the repeated transfers between storage compartments and accessing stations creates control problems when a large plurality of requests for data may be simultaneouly received. Control of the access mechanism becomes extremely complicated as the number of article transfers per given numbers of bytes of information transferred is increased. Accordingly, it is desirable not only to reduce the transfer time between a storage compartment and a processing station, but also it is desirable to reduce the number of transfers required for a given number of data bytes to be transferred.

The above-referred-to pending application discloses a rotating carousel article storage apparatus employing electronic velocity and position controls. Such controls drive the intermittently actuated article handler at a maximum acceleration, creating a possible overshoot problem. Such controls, while completely operable, can create maintenance requirements as well as being expensive to design and construct. A simpler solution to the velocity and position control of intermittently actuated apparatus is desired.

SUMMARY OF THE INVENTION

It is an object of the present invention to provide an improved, simplified, high-speed, modular, low-cost, position and velocity control for an intermittently actuated, high-speed article handler.

A continuously moving record container article carrier has a plurality of releasble article-containing storage locations. A transfer station preferably has a rotatable article handler having releasable article retainer for exchanging articles with the continuously moving carrier. It is important that the article transfer mechanism be accurately synchronized with the continuously moving carrier within specified tolerance determined by the size and spacing of the articles, as carried in the continuously moving carrier.

In accordance with the invention, an intermittently moved member has a tachometer member with tachometer markings distributed in accordance with the acceleration/deceleration characteristics of the intermittently moved member; that is, the spacings between or the mark sizes vary in accordance with the acceleration/deceleration characteristics.

A phase lock loop, or equivalent, phase synchronizes the tachometer signals from both the intermittently moved member and the continuously moving member, the latter preferably having a constant spacing between its tachometer markings.

The intermittently moved tachometer markings preferaby include a set of constant spaced markings for speed synchronizing the two moving members intermediate acceleration and deceleration. The foregoing and other objects, features, and advantages of the invention will become apparent from the following more particular description of a preferred embodiment of the invention, as illustrated in the accompanying drawing.

THE DRAWING

Figure 2:
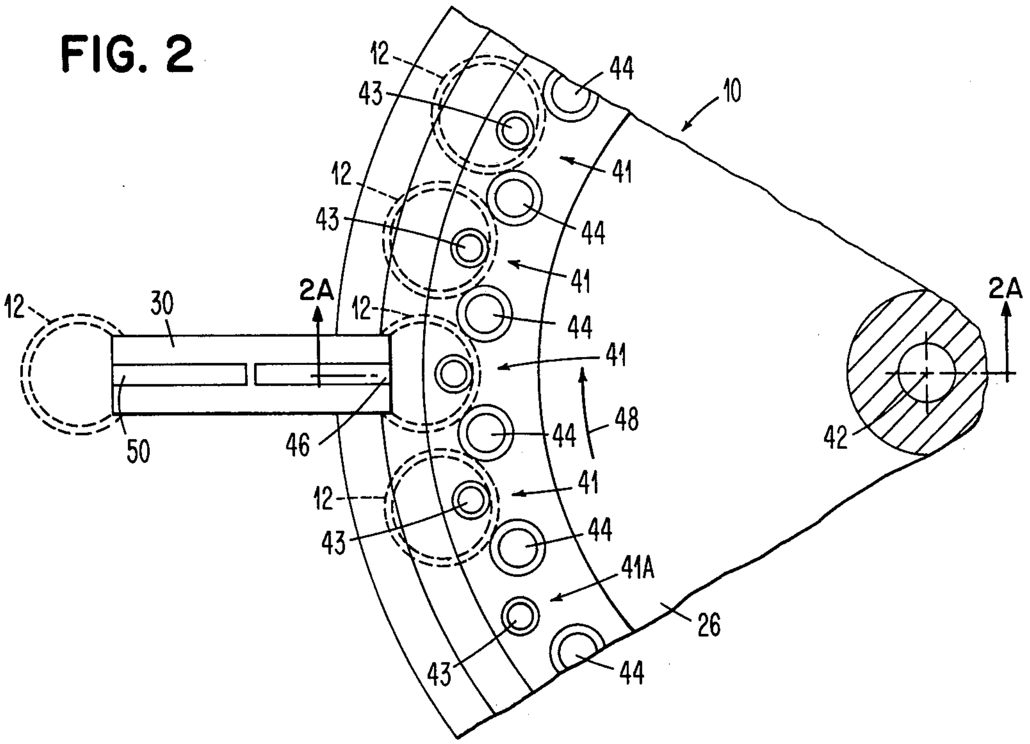
FIG. 2 is a partial simplified diagrammatic illustration of a cartridge transfer station and article storage member.
Figure 2A:
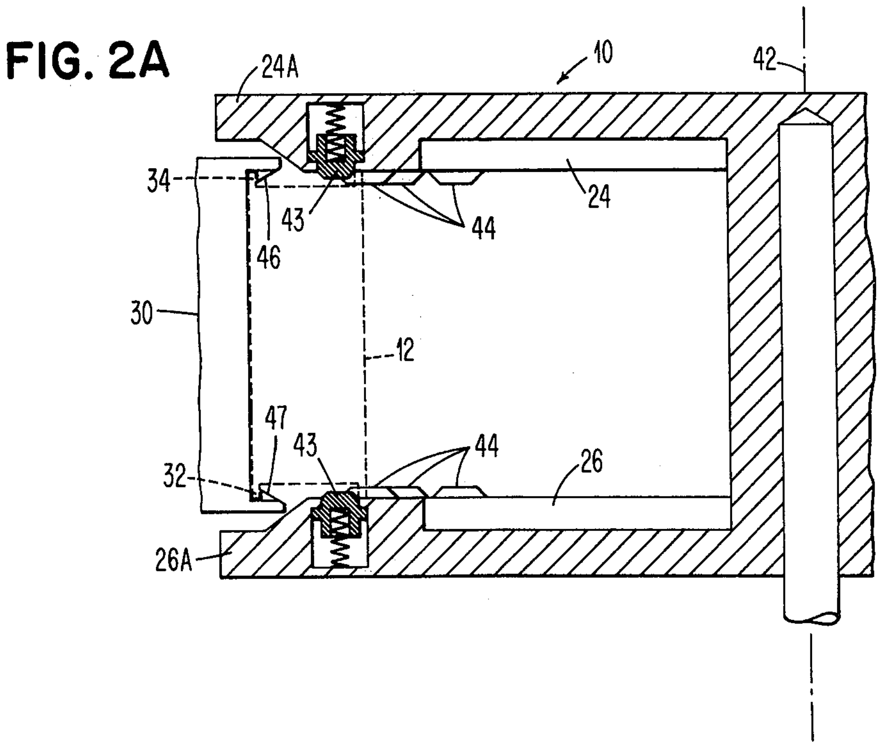

FIG. 2A diagrammatically illustrates an article storage location for a carrier as taken along lines 2—2 in FIG. 2.

Figure 3:
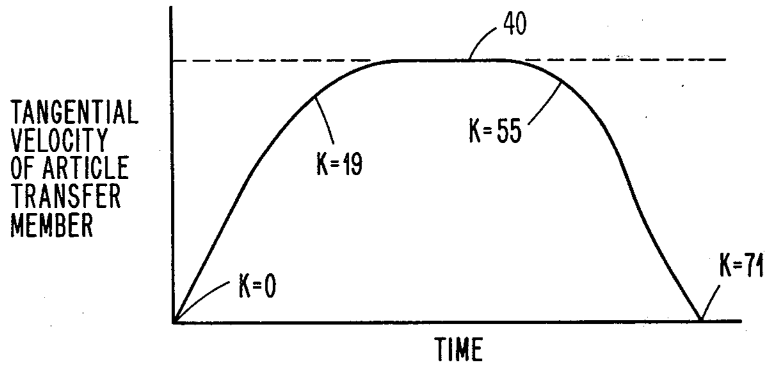

FIG. 3 is a tangential velocity-versus-time curve of the article transfer station for an article transfer operation.

Figure 1:
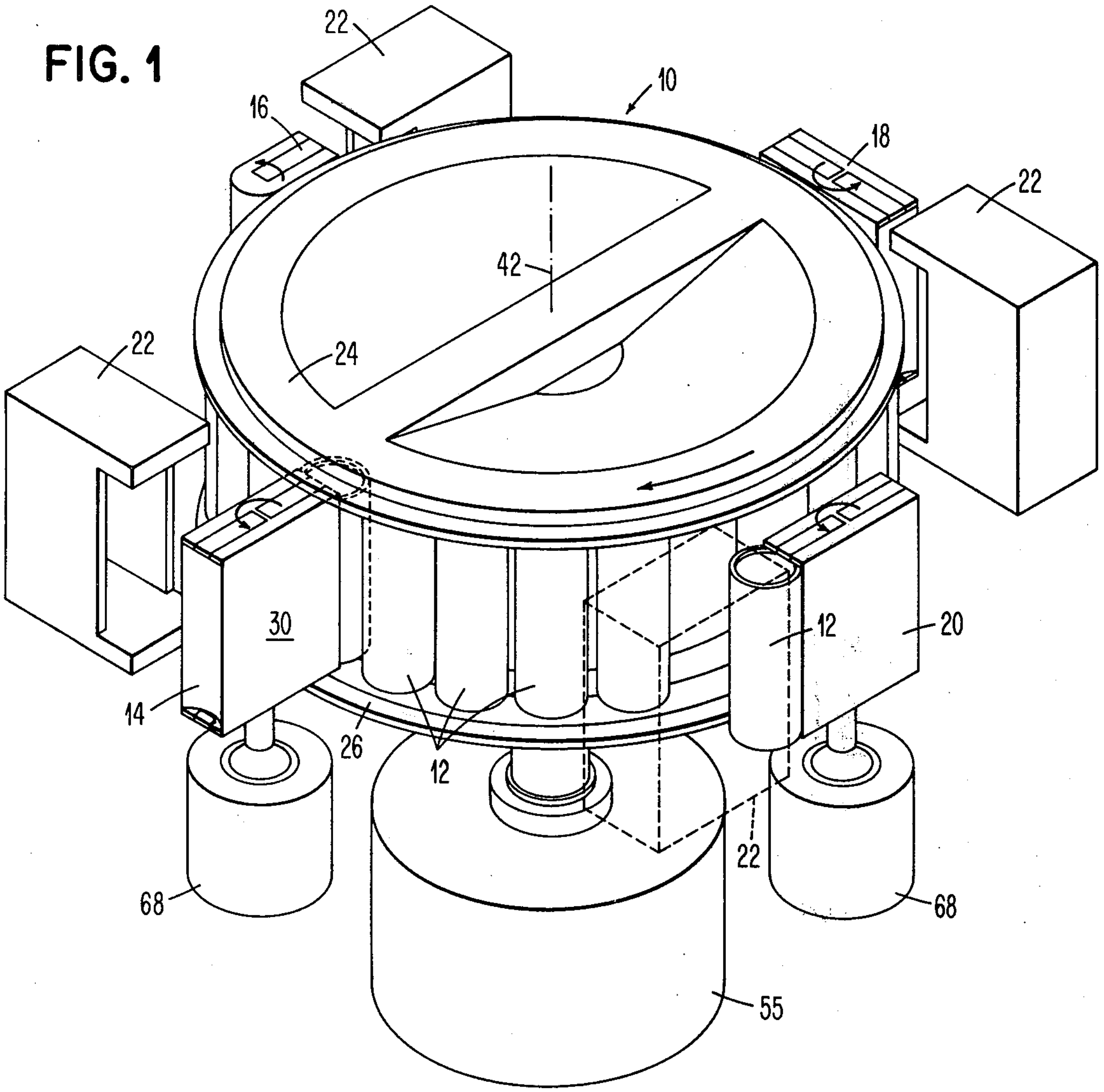
FIG. 1 is a simplified diagrammatic perspective view of an illustrative embodiments of the present invention.
Figure 4:
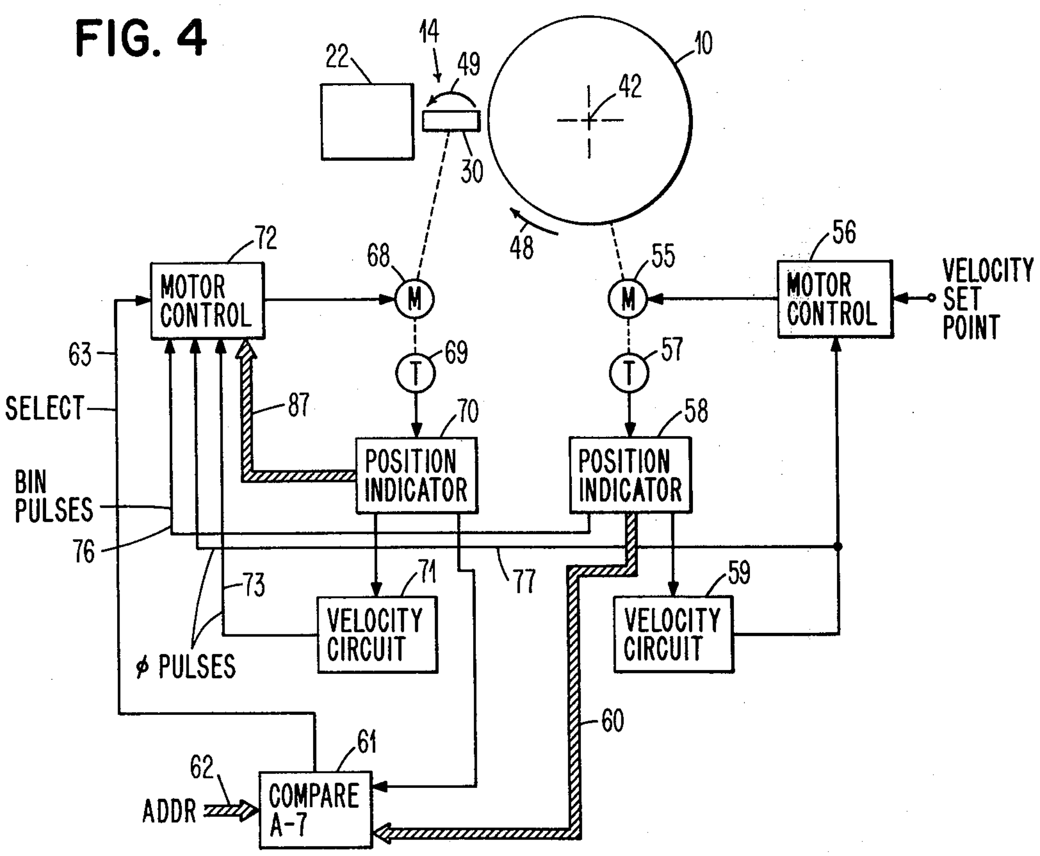

FIG. 4 is a simplified logic flow diagram of control apparatus usable with the FIG. 1 illustrated embodiment.

Figure 5:
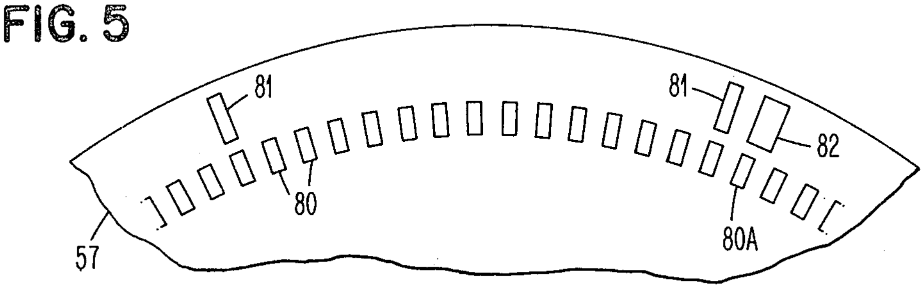

FIG. 5 is a partial diagrammatic showing of position indicia usable with the rotating article carrier illustrated in FIG. 1.

Figure 6:
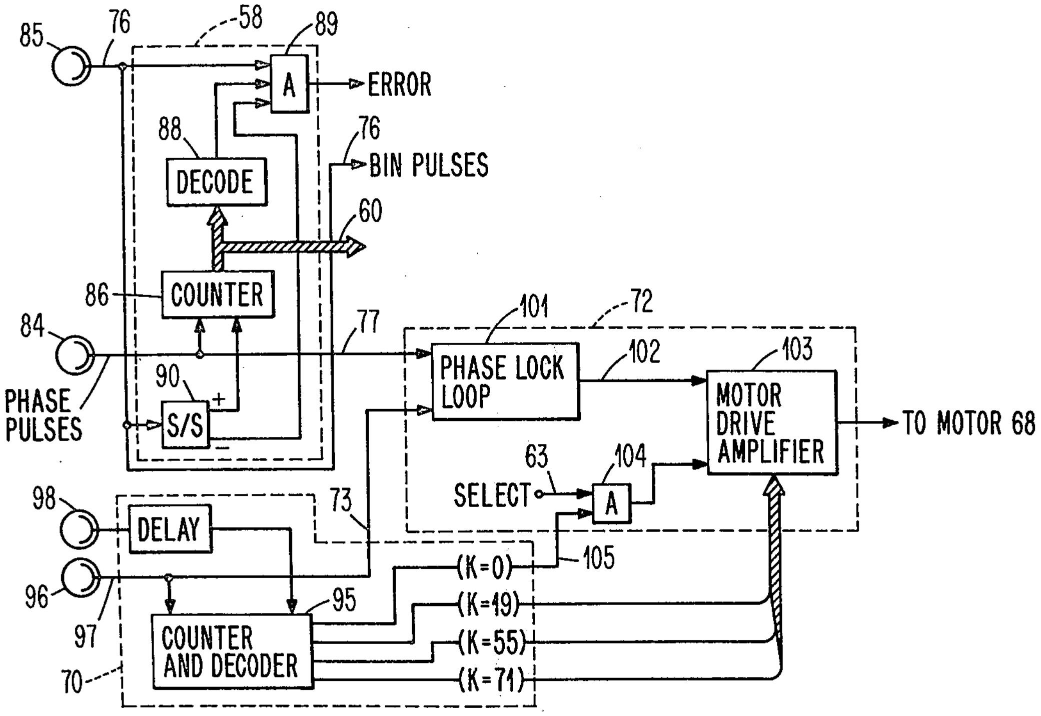

FIG. 6 is a simplified logic diagram of a portion of the control circuits illustrated in FIG. 4.

Figures 7, 8:
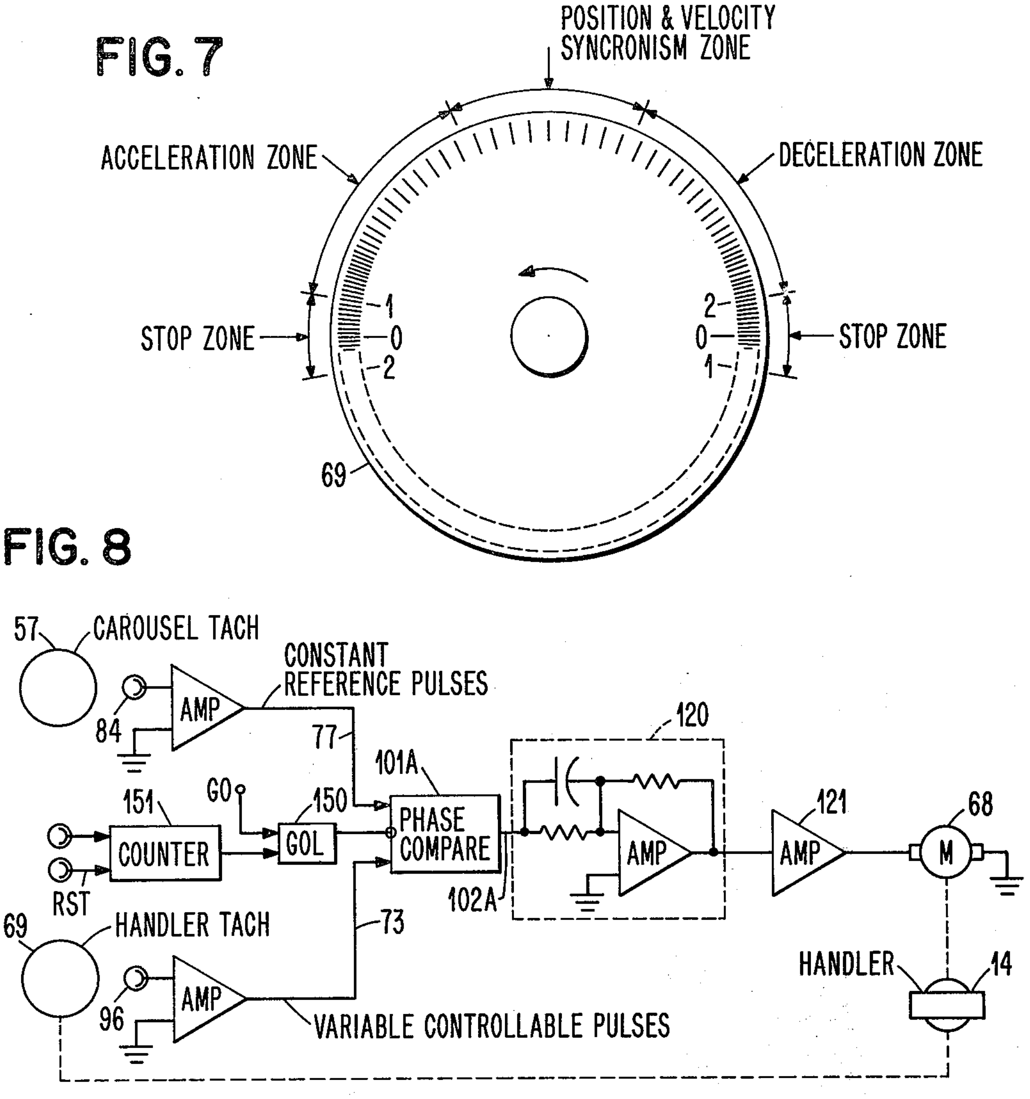

FIG. 7 is a diagrammatic showing of a handler tachometer disc using the present invention.

FIG. 8 is a simplified diagram showing a motor control circuit using the present invention.

Figure 9:
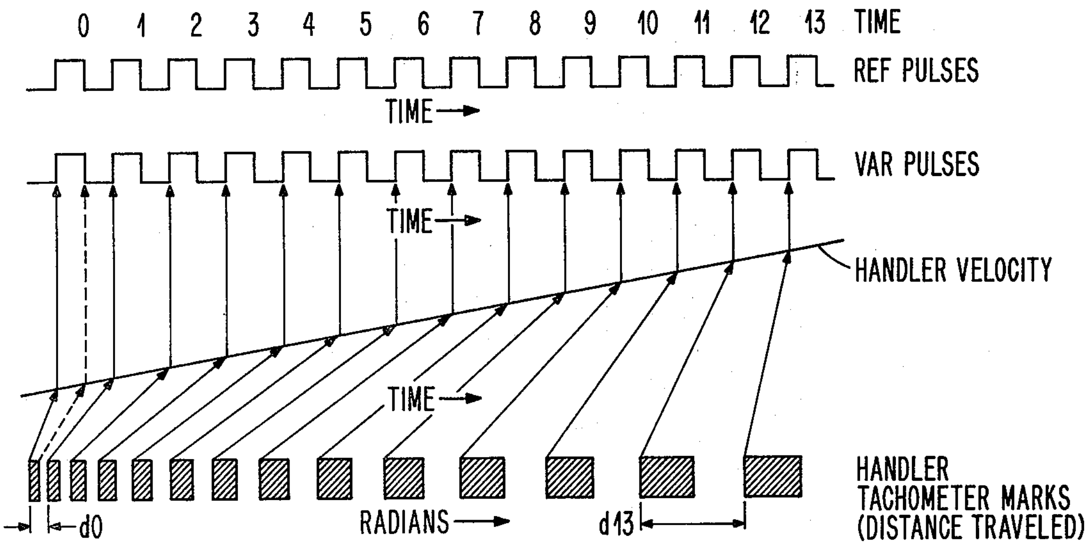

FIG. 9 is an idealized timing and space diagram illustrating operation of the invention.

Figure 10:
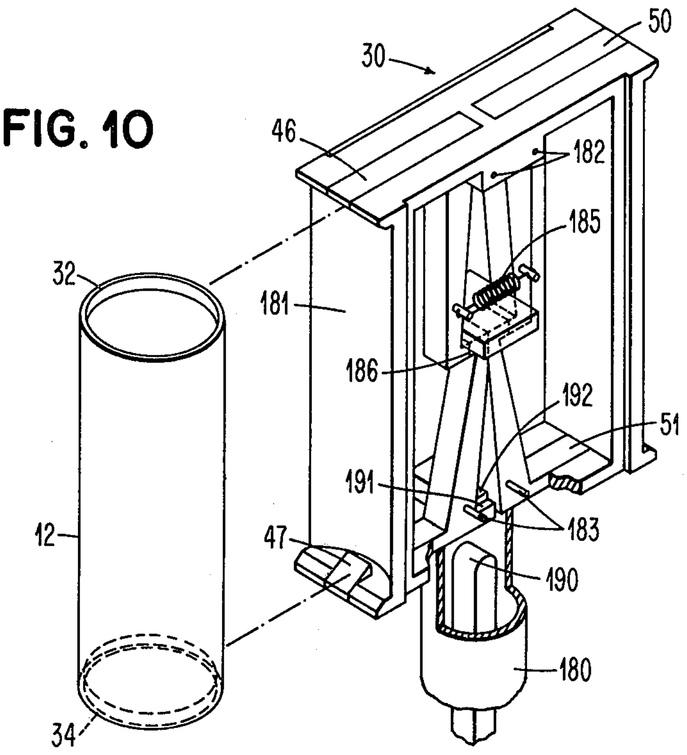

FIG. 10 is a simplified diagrammatic showing of a preferred article tranfer mechanism usable with any of the illustrated embodiments and further illustrating an perform in electronic hardware. The desirability of having large numbers of phase pulses is that more pulses equal more precision in phase-locking the article transfer member 30 motion to the carrier 10 motion.

In accordance with the invention, tachometer 69 associated with cartridge transfer station 14 through 20 has a set of tachometer markings or indicia which are a replica of the acceleration/deceleration characteristics of station 14.

As best seen in FIG 7, the tachometer 69 tachometer marks are closest together adjacent each stop zone and widest apart in a position and velocity synchronism zone. The acceleration and deceleration zone markings are variably spaced in accordance with the velocity profile of member 30, such as shown in FIG. 3. Since the tachometer 69 markings are phase compared with the markings of continuously rotating carrier 10 markings, the elapsed time between two successively tachometer mark sensings in any zone should be equal or close to equal, of course, when the tachometer is stopped. Looking at FIG. 7, as from stop point 0 to point 1, which demarks the stop and acceleration zone, member 30 is rotating relatively slow; i.e., the tachometer marks are closest together. In the acceleration zone, the spacing between successive two tachometer marks increases in accordance with the velocity profile until the position and velocity synchronism zone is reached. Here, the spacing between the marks is maximum and equal. During this zone, the tangential velocity of member 30 equals the tangential velocity of carrier 10 for enabling transfer of articles 12 therebetween. In the deceleration zone, the variable spacing between tachometer 69 marks follows the deceleration characteristics of member 30 which may or may not be symmetrical with respect to the spacings in the acceleration zone. At point 2, the stop zone is entered, with the minimum spacing indicating minimum velocity of member 30. Point 0 may be a fiducial mark for accurately postioning member 30 for article exchanging operations with either carrier 10 or one of the illustrated article processing stations 22.

The above-mentioned time space relationships are better understood by referring to FIG. 9, with a simplified abbreviated showing of variable spacing between tachometer marks in the acceleration zone. Fourteen times cycles are shown, each time cycle being equal and numbered consecutively from 0–13. The tachometer pulses from carrier 10 labeled REF pulses are a square wave. The tachometer pulses from member 69 are termed the variable pulses labeled VAR pulses. Assuming perfect synchronism between member 30, its tachometer 69, motor control 72, and the REF pulses, the VAR pulses should be indentical to the REF pulses. In a practical situation, there may be a small modulation in the VAR pulses as the servoes hunt one with respect to the other. In the present illustration, such hunting is ignored. The handler 30 speed changes linearly, with respect to time, as shown in the FIG. 9 illustration. Hence, the spacing between the handler tachometer marks is approximated by a linear change. Each opaque portion occupies one-half of the tachometer mark space, the other half being transparent. In cycle *d*0, the leading edge of the opaque portion generates the positive transition in the first VAR pulse. The trailing edge of the opaque portion 100 creates the trailing edge. The negative output half cycle corresponds to the transparent portion of section *d*0. The same is true for all succeeding tachometer markings through *d*13. Each successively numbered section *d*0–*d*13 occupies a slightly longer space on the tachometer disc corresponding to a slightly greater distance traveled per unit of time; i.e., the velocity is increasing as shown by the handler velocity curve. From FIG. 9, it is seen that the distance traveled at *d*13 is substantially greater than the distance traveled at *d*0; yet the elapsed time is equal since the VAR pulses are equal. In this manner, the variable spacing of tachometer markings provides a constant frequency variable output signal yielding a simplified servo control which not only enhances reliability, but also simplifies circuit design.

Referring now to FIG. 8, the simplified servo circuit usable with the variable tachometer spacings of tachometer 69 and the constant space marks 80 as shown in FIG. 5 for carrier 10 is described. Carrier tachometer 57 supplies its pulses through photocells 84 which are suitably amplified and supplied over line 77 to phase compare circuit 101A. Phase compare circuit, 101A compares the phase of the REF pulses and the VAR pulses shown in FIG. 9. The VAR pulses are supplied from tachometer disc 69 via photocell 96 and line 73. Phase compare 101A consists of any suitable phase compare which generates an analog error circuit indicative of the phase error as over line 102A. Differentiating filter 120 supplies the input error signal plus the differential signal through power amplifier 12 to drive motor 68. Handler 14, driven by motor 68, in turn rotates with tachometer 69 to complete a servomechanism loop. Other forms of motor characteristic compensation may be employed in filter 120.

Using the above-described operation and apparatus, intermittent motion of handler 14 is synchronized to a continuously rotating carrier or other moving member in a simple, yet effective, manner.

Phase compare 101A is enabled to operate each time handler 14 is actuated. GO latch 150 is set to the GO state actuating compare 101A. Counter 151 counting a predetermined number of tachometer 57 signals (from marker 81) supplies a reset signal to reset GO latch 150. Latch 150 then actuates phase compare to supply a deactivating or hold signal to motor 68, as is known. The article location mark "0" pulse also resets counter 151, causing it to supply the deactivating signal; hence, if a tachometer mark is reissued, latch 151 is still reset. A second 60 signal restarts handler intermittent motion. Counter 151 continuously counts but has no effect until GO latch 151 is set.

Also, since the illustrated radii ratio of members 30 and 10 is 4:1, article transfer station tachometer 69 has one-fourth the number of phase marks as carrier 10. To make the tangential velocities identical in the position and velocity synchronism zone, the marks in the apparatus 14 position and velocity synchronism zones and carousel 10 are spaced in accordance with the respective radii. The radii ratio also directly determines the variable spacing in the acceleration and deceleration zones. Tachometer 69 preferably has plural fiducial marks 0 indicating its stationary rotational locations within its stop zone, one fiducial mark for each position it transfers an article with its associated processing station.

There are 16 phase marks 80 for each storage location mark 81. At each location or bin mark 81, address counter 86 should have all 1's in the lower four bit positions, all 1's representing decimal 15 which is the maxiconinued rotation of member 30 at the proper velocity can insert an article held by detents 50 and 51 into storage location 41A. In the illustrated embodiment, picker 30 is stopped, then restarted, for such action. In this regard, detents 50 and 51 firmly hold article 12 until such time as the article is retained in position 41A by detents 50, 51, whereupon detents 50 and 51 are releasing allowing members 30 to rotate away from the stored article 12. By timing and repeating the above-described operations, a plurality of articles 12 can be fetched and stored from rotating carousel 10 in each one of its revolutions. Optionally, all the transfers of articles 12 between a member 30 and a processing station 22 can be simultaneous with transfers between such station 30 and carrier 10. In this manner, all detents 50, 46, and 47 are simultaneously actuated.

FIG. 4 diagrammatically illustrates control circuits usable with the illustrated embodiments of FIG. 1 for effecting intermittent synchronous operation of a tranfer station 14–20 with a continuously rotating carousel. FIG. 4 only illustrates one station 14–20, it being understood that a plurality of stations 14–20 can be similarly controlled. Carousel 10 is continuously rotated by motor 55 either with or without speed control. FIG. 4 shows motor 55 under control of motor control circuit 56. Tachometer 57 mounted on motor 55 indicates the position and velocity speed of carousel 10. Position indicator 58, described later with respect to FIG. 6, gives the precise location of carousel 10. Postion indicator 58 supplies signals to velocity circuit 59 which determines the velocity speed of carousel 10 in accordance with known techniques. Additionally, position indicator 58 supplies cartridge (article) location 41 indication signals over cable 60 to compare circuit 61. For the purpose of discussion, it is assumed that the address which position indicator 58 refers to is the address of the storage location 41 presently in operating position with article exchange apparatus 14. Because of the acceleration time of member 30 within article transfer station 14, it is selected to start rotation of member 30 about three and one-half cartridge storage locations upstream. It is preferred that this selection achieve member 30 acceleration with minimum total energy. Each selection is based upon total system dynamics. Accordingly, compare circuit 61 compares the desired storage location address received via cable 62, minus three and one-half, with the position indicator 58 supplied address signals on cable 60. When a match is indicated, a select signal travels over line 63 to motor control circuit 72. Control circuit 72 actuates article transfer station motor 68 to rotate member 30 in the direction of arrow 49 in accordance with the velocity profile of FIG. 3. Later-described tachometer 69 monitors the rotation of member 30 to supply position-indicating pulses to position indicator 70. Indicator 70 supplies its actual position signals over cable 87 to motor control 72 for its positioning control actions which are performed in accordance with well-known techniques. Additionally, position indicator 70 supplies pulses to velocity circuit 71 which, in turn, supplies "phase" pulses over line 73 to motor control 72. Phase pulses on line 73 are compared with similar phase pulses from velocity circuit 59 supplied over line 77. By phase comparing the pulses on lines 73 and 77 for a phase lock loop control, precise tangential velocity and positioning between carousel 10 and apparatus 14 are achieved. Additionally, position indicator 58 supplies storage location 41 indicating or bin pulses over line 76 for timing motor control 72 with respect to the storage locations; that is, a select signal on line 63 may be received by motor control 72 and somewhat prior to the time that a storage location or bin mark, as will be described, has passed the reference position. Hence, motor control 72 may wait momentarily until a bin pulse on line 76 is received for actuating apparatus 14 in precise synchronism with carousel 10 rotation.

An exemplary embodiment of position indication for effecting motor control and position detecting and control is shown in FIGS. 5 and 6. Position of carousel 10 is indicated by tachometer 57 two tracks of position idicia. The first, or fine track, may have 576 position or phase-indicating marks 80 evenly disposed about the tachometer periphery. In addition, storage location 41 indicating marks 81 are disposed evenly about tachometer 57 in precise alignment with storage locations 41. It is preferred that the phase-indicating marks 80 are precisely related to the storage location indicating marks 81. Since each cartridge location 41 is to be individually addressed, a fiducial mark 82 is provided. This mark is of greater circumferential extent than the corresponding phase-indicating mark 80A. The use of this fiducial mark 82 in resetting address counters is well known and but briefly described with respect to FIG. 6. Fiducial mark 80A corresponds to circumferential address O, while the immediately preceding mark, i.e., the one to the left as seen in FIG. 5, corresponds to address 575. Similarly, the mark immediately preceding fiducial mark 82 is cartridge location 35; while the one to the right (not shown in FIG. 5) is storage location 0, yielding 36 storage locations in carousel 10. Any form of tachometer or position markings and number of storage locations may be employed.

The article location indicating marks 80, 80A, 82 are not absolutely necessary. When phase marks 80 are a convenient multiple of the number of article locations, a counter (not shown) then indicates article locations. A fiducial mark resets such counter to a reference count. If 16 marks 80 represent center-to-center location spacing, then every 16th count represents an article location. The counter modulus is at least 16 times the number of article locations.

The carousel tachometer disc 57 provides the master or conrolling signals for both phase and velocity to the servo system (FIGS. 6 and 8). It must have at least one pulse per article location 41, but preferably has as many pulses as possible, being an integral multiple (preferably a power of 2) of the number of article positions 41. The radius of the intermittently rotated picker member 30 is selected to be as small as possible and consistent with convenient placing of the processing stations 22. The reason for keeping the picker members 30 radius small is to minimize the rotational inertial of the picker/cartridge combination and thereby minimize the power required to drive its servomotor 68. The picker 30 radius is preferably selected to be an even fraction, such as ½, ⅓, ¼, 1/5, ⅛, etc., of the carrier 10 radius in order to keep the servo logic simple. The article transfer tachometer 69 must have at least one pulse per phase pulse from the carousel tachometer 57, but may have any even multiple of such pulses.

The reason for selecting even multiples and powers of 2 for the various ratios and tachometer pulses is not theoretical, it is practical. Even numbers and powers of 2 simply make the servo computations much easier to mum count indicatable by marks 80 between storage location 41 marks 81. Accordingly, counter 86 increments once for each pulse supplied by photocell system 84 over line 77. The address of a storage location 41 is indicated by the bit positions in counter 86 having a binary value of $2^4$ and greater. Bit positions $2^0$ through $2^3$ indicate "address-phase" locations between centers of storage locations. Decode 88 detects the all-1's condition in counter 86 locations $2^0$ through $2^3$. If that condition is not met and photocell system 85 is supplying a bin-indicating pulse over line 76 in response to sensing mark 81 and fiducial single-shot 90 has not expired its time, an error signal is supplied by AND 89. An error has occurred in counter 86.

Detection of a fiducial mark is initiated when fiducial single-shot 90 is set to the active condition by each bin pulse on line 76. Its timing is such that the elapsed time between the leading edge of a mark 81 and fiducial mark 82 is substantially less than the timeout period of single-shot 90. Accordingly, when single-shot 90 is activated, it resets counter 86 to an all-0's condition such that mark 80A corresponds to position 0, as well as resetting the storage location count to 0. The negative or complementary output of fiducial single-shot 90 is supplied to AND circuit 89. If it has not reset, i.e., a fiducial mark 82 is being detected, then AND 89 is disabled. However, if single-shot 90 has timed out, AND circuit 89 is enabled for detecting an error condition between the count afforded by phase pulses from photocell 84 and the bin pulses from photocell 85. By making the fiducial mark 82 broader in circumferential extent than the 0's phase mark 80A, tolerance problems are avoided.

Position indicator 70 includes a similar counter 95 indicating the rotational position of member 30 in accordance with the received phase pulses from photocell system 96 over line 97 and supplied to motor control 72 over line 73. A fiducial mark (not shown) is sensed by photocell system 98 and is delayed to reset counter 95 immediately after the phase pulse on line 97 has incremented the counter. The counter 95 has several outputs indicating relative positions of member 30 with respect to the desired velocity curve of FIG. 3. When the count is 0, member 30 is in a stationary position. When the count is equal to 19, maximum speed should occur allowing current amplitude in motor 68 to be adjusted to accommodate such flattening of the acceleration curve, as is well known. Similarly, when the count is equal to 55 a short time thereafter, deceleration is initiated. When the count equals 71, the velocity should be 0, with the counter being reset by the received and delayed fiducial pulse from photocell system 98.

Motor control 72, shown in simplified form, includes phase-locked loop 101 receiving the phase pulses over lines 73 and 77. These are phase compared with an error signal being supplied over line 102 to motor drive amplifier and shapers 103. These amplifiers 103 may have the usual known motor drive shaping circuits for effecting the velocity curve of FIG. 3 and as replicated in tachometer 69. Operation of motor control 72 when using the present invention is described later while referring to FIGS. 8 and 9. AND circuit 104 turns motor drive amplifiers 103 on and off in joint response to the select signal received over line 63 and the K=0 pulse received over line 105. That is, member 30 will not be rotated unless it is in a reference position. This ensures proper positioning control at all times.

Instead of having a single rotating carousel 10 being serviced by a plurality of article exchanging apparatus and associated processing stations, a plurality of such carousels can be axially stacked. A single motor continuously rotates all tiers under control of the FIG. 4 illustrated control circuits 110.

Referring next to FIG. 10, a preferred article transfer mechanism is shown in simplified diagrammatic form. A mechanism for handling an article 12 in the plane parallel to its elongated axis includes rotatably mounted article transfer member 30. Camming and release mechanisms in shroud 180 operate article retaining fingers 46 and 47 for selectively fetching and storing article 12. The article 12 may be nested or held flat against a fixed or spring-loaded platform, as at 181.

To transfer article 12 into the FIG. 10 illustrated article handler, the article 12 is preferably placed in engaging relationship with fingers 46 and 47. Engagement of the picking flanges with fingers 46 and 47 ends forces the fingers 46, 47 apart.

Pivoting of finger 47 about pivot axis 183 simultaneously causes finger 46 to pivot about axis 182. After the hooks on fingers 46 and 47 have traveled over the ends of the annular article flanges 32 and 34, extension spring 185 forces fingers 46 and 47 to come together for retaining article 12. Spring 185 acts on lower finger 47 through camming engagement at 186. Fingers 50 and 51 are simultaneously actuated as just described for fingers 46 and 47.

The camming means having cam 190 within shroud 180 can be designed to either operate all fingers 46, 47, 50, and 51 simultaneously or individually. For example, the cam 190 can operate on lower finger 47 pivoting it downwardly about axis 183. The camming at 186 forces upper finger 46 upwardly and outwardly for releasing an article held in the handler. Such selective cam actuation can be based upon the rotational position of handler 30 or can be actuated by electrical actuated apparatus (not shown).

Once an article 12 has been retained by fingers 46 and 47, handler member 30 rapidly rotates interchanging rotational positions of fingers 46 and 47 with 50 and 51 for releasing another article 12 to another mechanism (not shown in FIG. 10) and simultaneously permitting a second article 12 to be placed in fingers 46 and 47. When fingers 46, 47, and 50, 51 are made operationally independent, asynchronous article loading and unloading is provided.

The camming means within shroud 180 may include vertically movable cam 190 geared to the rotation of member 30 by an eccentric (not shown). In this arrangement, article 12 is not used to separate the fingers. As control cam 190 moves upwardly, it engages inward control arms 191 and 192, respectively, on fingers 47 and 51 pivoting them upwardly, about axes 183 (hence, fingers 46, 47 outwardly). As a result, the fingers 47 and 51 respectively pivot about axes 18 forcing all of the fingers apart simultaneously. As control cam 190 moves downwardly in synchronism with the rotation of member 30, spring 185 urges the fingers 46, 47 to return to article holding position. In the event of electrical actuation, control cam 190 can be replaced by two small electrical actuators not shown, one for each of the control arms 191 and 192, which are activated in synchronism with the positioning mechanism illustrated in FIG. 4. That is, upon the approach of the end portion 46, 47 of member 30 to the article contained in the continuously moving article carrier, fingers 46 and 47 are pivoted outwardly at a central position, i.e., when member 30 is radially aligned for an instant with a radius on the continuously rotating carousel 10. The electrical actuators (not shown) are released for allowing spring 185 to move the fingers 46, 47 together for removing the article 12 in the continuously rotating carrier 10. Such deactuation of a magnet can be via using the bin pulses supplied as shown in FIG. 4. The illustrated apparatus can be employed for any of the illustrated arrangements.

While the invention has been particularly shown and described with reference to a preferred embodiment of the invention, it will be understood by those skilled in the art that various changes in form and detail may be made therein without departing from the spirit and scope of the invention.

What is claimed is:

1. For an article storage and retrieval apparatus for handling a plurality of articles having a predetermined shape and one given dimension, a continuously moving article carrier having a plurality of article retaining means disposed about its outer periphery and traveling along a given travel path at a given speed;

a transfer station adjacent said outer periphery and interposable into said travel path and including intermittently moved article engaging means for selectively transferring articles to and from an article storing location without stopping or altering the speed of said article carrier and including speed control means for matching speed of said article engaging means to that of the article retaining means during said selective article transfer;

an improved control apparatus, including in combination:

a tachometer element in said transfer station and mounted for movement with said article engaging means, said tachometer element having tachometer marks spaced in accordance with a predetermined velocity profile for said engaging means, spacing between predetermined adjacent ones of said tachometer marks being inversely related to desired speed of said engaging means with successively adjacent spacings varying in length for indicating acceleration/deceleration speed change, means for supplying tachometer signals in response to movement of said tachometer element; and control means receiving said tachometer signals and having means operatively associated with said continuously moving article carrier for measuring said given speed, motor control means in said central means jointly responsive to said measured given speed and said tachometer signals to synchronize the speed of said engaging means to said article carrier during said selective article exchange and to accelerate and decelerate said engaging means to and from said given speed in accordance with said velocity profile indicated on said tachometer element by said variably spaced marks.

2. The apparatus set forth in claim 1 wherein saaid desired speed change is a minimum energy profile for said article engaging means during acceleration/deceleration and said continuously moving article carrier moves at a substantially constant speed and includes a tachometer element with evenly spaced apart marks disposed in operative relationship to said measuring means for enabling measurement of said given speed.

3. The apparatus set forth in claim 1 wherein said tachometer element is a circular disk with tachometer markings about its periphery and having first and second stop zones on a common diameter and a pair of position-and-velocity synchronization zones disposed about a diameter perpendicular to the first-mentioned diameter, said tachometer marks within said position-and-velocity zones being evenly spaced apart a distance greater than spacings in any other of said zones, said marks in said stop zone being closely spaced apart, and all of the marks intermediate said zones being said predetermined adjacent ones of said marks which are variably spaced apart in accordance with said desired acceleration and deceleration characteristics of said article engaging means.

4. The apparatus set forth in claim 1 wherein said continuously moving carrier has a circular tachometer disk with tachometer marks evenly spaced apart its periphery, means in said measuring means for sensing said tachometer marks and supplying constant reference pulses therefrom;

said tachometer element on said article engaging means being a circular element having said tachometer marks about its periphery;

said supplying means supplying said tachometer signals as variable controllable pulses, said control means receiving said constant reference pulses and said tachometer signals and phase comparing same for supplying a control signal; and motor means operatively connected to said article engaging means within said transfer station and responsive to said control signal for actuating said article engaging means in a rotary sense in accordance with said velocity profile as represented by said control signal resulting from the phase comparison of said constant reference pulses to said variable controllable pulses.

5. A positioning and speed control apparatus for a motor, the movement including in combination;

a first tachometer element having evenly spaced apart marks;

a second tachometer element relatively movable with respect to said first tachometer element and having tachometer markings spaced apart in accordance with a desired functional characteristic, spacing between predetermined adjacent ones of said tachometer markings being inversely related to desired relative speed between said elements adjacent each of said tachometer markings;

first means for sensing the marks of said first tachometer element and second means for sensing the marks of said second tachometer element; and phase comparison means responsive to said first and second sensing means to supply a control signal.

6. The apparatus set forth in claim 5 further including motor means operatively connected to one of said tachometer elements and to a load for moving same, said load and said motor exhibiting certain inertial characteristics, said spacing between predetermined adjacent markings on said second tachometer element representing said desired functional characteristic as acceleration and deceleration characteristics of said load and motor in a minimum energy expenditure mode for achieving predetermined relative acceleration/deceleration between said elements adjacent each said tachometer markings, and an electrical connection receiving said control signal and supplying a motor actuating signal to said motor for operating said load.

7. The apparatus set forth in claim 6 wherein said motor is operatively connected to said second tachometer element whereby the load is actuated in accordance with minimum energy expenditure of said motor; and means for moving said first tachometer element at a relatively constant given speed.

8. The method of operating a motor having a first tachometer element with tachometer marks spaced apart in accordance with the velocity profile desired of a servomechanism, successive spacing between said marks varying to indicate accelerations/decelerations of said velocity profile, the improved method including the following steps in combination:

supplying a set of constant reference pulses;

selectively actuating said motor to rotate said tachometer element, sensing said marks and supplying a set of variable controllable pulses representing the relationship of the actual motor performance with respect to the desired performance indicated by the spacing of said tachometer marks; and phase comparing the constant reference pulses with said variable controllable pulses, supplying a control signal in accordance with said phase comparison and changing the actuation of the motor until there is a time coincidence between said constant reference pulses and a variable controllable pulse such that motor performance follows said tachometer mark spacing on said tachometer element.

9. The method set forth in claim 8 further including a continuously moving member having a second tachometer element with evenly spaced-apart marks;

the improvement further including the following steps in combination;

sensing the marks of said second tachometer element on said continuously moving tachometer element and supplying said constant reference pulses from said sensed marks and including synchronizing the speed of said tachometer elements at least during a small portion of movements thereof whereby speed is precisely synchronized and at other times moving said first tachometer element at diverse speeds in accordance with said spacings.

* * * * *